(12) United States Patent
Kitamura et al.

(10) Patent No.: US 6,715,123 B2
(45) Date of Patent: Mar. 30, 2004

(54) REAL-TIME RECORDING SYSTEM AND REAL-TIME RECORDING METHOD

(75) Inventors: Yoshitaka Kitamura, Kasugai (JP); Masashi Yamawaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 09/873,369

(22) Filed: Jun. 5, 2001

(65) Prior Publication Data

US 2002/0083382 A1 Jun. 27, 2002

(30) Foreign Application Priority Data

Dec. 22, 2000 (JP) ........................................ 2000-390552

(51) Int. Cl.$^7$ .............................................. G11C 29/00
(52) U.S. Cl. ...................................................... 714/769
(58) Field of Search ................................ 714/763, 769, 714/770, 771; 711/147, 151

(56) References Cited

U.S. PATENT DOCUMENTS 4,455,655 A * 6/1984 Galen et al. ................ 714/758
5,610,929 A * 3/1997 Yamamoto .................. 714/785
5,740,358 A * 4/1998 Geldman et al. ............. 714/47
6,009,550 A * 12/1999 Gosula et al. ............... 714/769
6,401,168 B1 * 6/2002 Williams et al. ............ 711/112
6,530,000 B1 * 3/2003 Krantz et al. ............... 711/151

* cited by examiner

Primary Examiner—Albert Decady
Assistant Examiner—Joseph D. Torres
(74) Attorney, Agent, or Firm—Staas & Halsey LLP

(57) ABSTRACT

A real-time recording system that decreases the load applied to a central processing unit, which controls recording. The recording system includes a memory for storing input data. An error correction circuit is connected to the memory for generating write data from the input data and storing the generated write data in the memory. A formatter circuit is connected to the memory and the error correction circuit for reading the write data stored in the memory and writing the read write data to the recording medium in real-time. The error correction and formatter circuits are controlled for the generation of the write data with the error correction circuit and the writing operation with the formatter circuit by a plurality of control signals. The control signals are transferred between the error correction circuit and the formatter circuit.

15 Claims, 15 Drawing Sheets

REAL-TIME RECORDING SYSTEM AND REAL-TIME RECORDING METHOD

BACKGROUND OF THE INVENTION

The present invention relates to a real-time recording system, and more particularly, to a real-time recording system that records image data or the like in real-time to a recording medium such as a DVD-RAM.

When a real-time recording system records image data recorded by a video camera to a recording medium in real-time, the recording system receives the image data and at the same time successively writes the received image data to the recording medium. The recording system performs an error correction process on the write data to increase the reliability of the write data. The recording system has a central processing unit, such as an MPU, to control the recording of the image data. The load applied to the central processing unit has increased in recent years. Thus, it has become required that the load on the central processing unit be decreased.

FIG. 1 is a schematic block diagram of a prior art real-time recording system 50. The recording system 50 records image data to a DVD-RAM 7 in real-time. Further, the recording system 50 has a control unit 1, an MPU 5, and a memory 6.

The control unit 1 includes an error correcting code (ECC) circuit 2, a formatter circuit 3, and a bus 4. The bus 4 connects the ECC circuit 2 and the formatter circuit 3. The ECC circuit 2 and the formatter circuit 3 are also connected to the memory 6. The bus 4 is connected to the MPU 5. The formatter circuit 3 is connected to the DVD-RAM 7.

When the real-time recording system 50 records image data to the DVD-RAM 7, data is transferred via a host interface and temporarily stored in the memory 6. The data is sequentially stored in partitioned areas m, m+1, . . . , of the memory 6. In each of the areas m, m+1, . . . , data is stored in block units. Each block of data includes 16 sectors.

The data stored in the memory 6 is transferred to the ECC circuit 2. A data identification (ID) is added to each sector. To increase data reliability, the data undergoes a scramble process and an error detecting code (EDC) and ECC error correction process. The processed data is stored in the memory 6 again. The error correction process is performed on each block of data.

Then, the formatter circuit 3 reads the processed data from the memory 6 one block at a time and reads a header ID from the DVD-RAM 7. The formatter circuit 3 modulates the data and writes the modulated data to an area of the DVD-RAM 7 corresponding to the header ID.

If the formatter circuit 3 is unsuccessful in reading the header ID that corresponds to area N of the DVD-RAM 7 (FIG. 2) in which data is to be written, the formatter circuit 3 detects a header error and generates an error signal. The error signal is sent to the MPU 5.

The MPU 5 provides the error signal to the ECC circuit 2 and instructs the next data that is to be written. The ECC circuit 2 adds 10 h (hexadecimal) to the value of the ID of the data at which the write error occurred and performs the ECC process on the error data again. The reprocessed data is stored again in the memory 6.

When, for example, write data of a block that includes a write error is stored in area r, the reprocessed data is stored in area r+1.

The reprocessed data stored in area r+1 is block-slipped and written to the DVD-RAM 7 at area N+10 h, which is the area next to area N.

In the real-time recording system 50, when a read error of the header ID occurs, the MPU 5 recognizes the read error and instructs the ECC circuit 2 of the write data that is to be generated next. The MPU 5 recognizes the area of the memory 6 in which the write data generated by the ECC circuit 2 has been stored. This increases the load applied to the MPU 5 and decreases the operating speed of a DVD recording/reproduction device, which includes peripheral devices controlled by the MPU 5.

Further, the re-writing is controlled by means of the MPU 5. This increases the time required to generate the re-write data.

SUMMARY OF THE INVENTION

It is an object of the present invention to provide a real-time recording system that decreases the load applied to a central processing unit, which controls recording.

To achieve the above object, a first perspective of the present invention is a recording system for receiving input data and simultaneously recording the input data to a recording medium. The system includes a memory for storing the input data. An error correction circuit is connected to the memory for generating write data from the input data and storing the generated write data in the memory. A formatter circuit is connected to the memory and the error correction circuit for reading the write data stored in the memory and writing the read write data to the recording medium in real-time. The error correction and formatter circuits are controlled for the generation of the write data with the error correction circuit and the writing operation with the formatter circuit by a plurality of control signals. The plurality of control signals are transferred between the error correction circuit and the formatter circuit.

A second perspective of the present invention is a method for recording data in a recording system including a memory for storing input data, an error correction circuit connected to the memory for generating write data from the input data and storing the generated write data in the memory, and a formatter circuit connected to the memory and the error correction circuit for reading the write data stored in the memory and writing the read write data to a recording medium in real-time. The method includes generating the write data with the error correction circuit by transferring a plurality of control signals between the error correction circuit and the formatter circuit, and writing the write data to the recording medium with the formatter circuit according to the plurality of control signals.

Other perspectives and advantages of the present invention will become apparent from the following detailed description and claims, taken in conjunction with the accompanying drawings, illustrating by way of example the principles of the invention.

BRIEF DESCRIPTION OF THE DRAWINGS

The invention, together with objects and advantages thereof, may best be understood by reference to the following detailed description of the presently preferred embodiments together with the accompanying drawings in which.

DETAILED DESCRIPTION OF THE PREFERRED EMBODIMENTS

Figure 1:
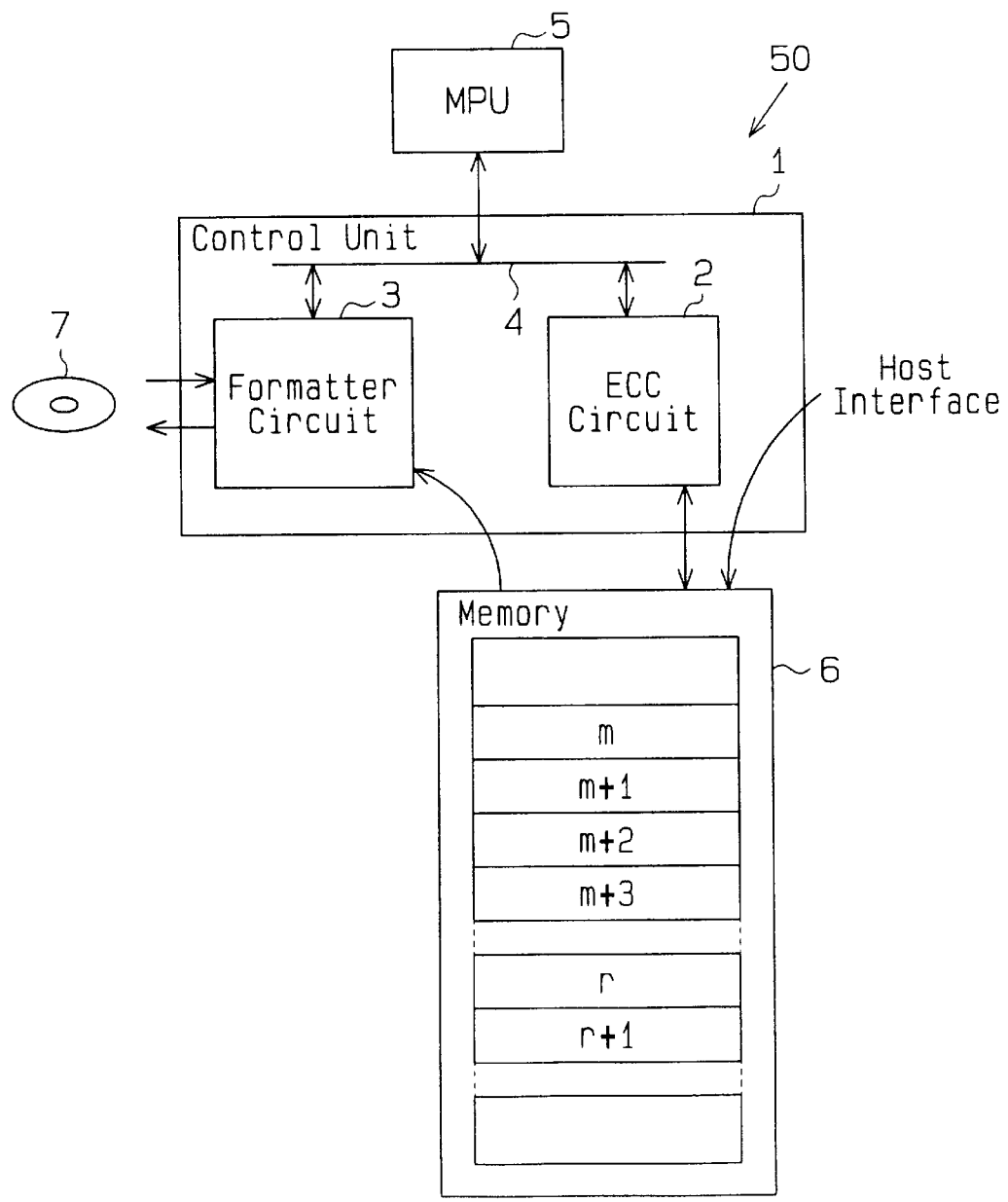
FIG. 1 is a schematic block diagram of a prior art real-time recording system.
Figure 2:
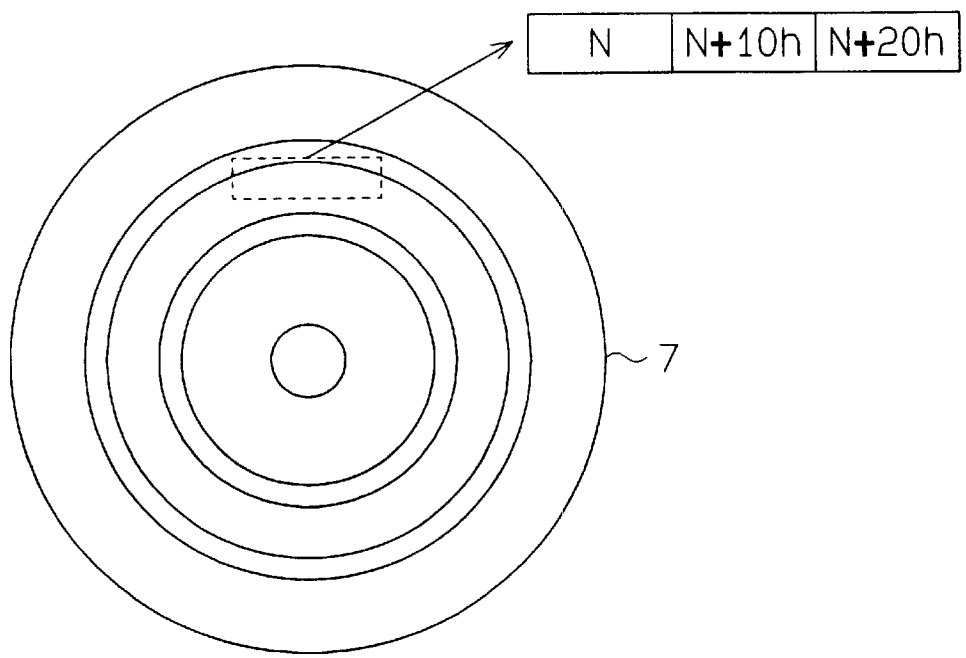
FIG. 2 is an explanatory diagram illustrating a block-slip.

In the drawings, like numerals are used for like elements throughout.

Figure 3:
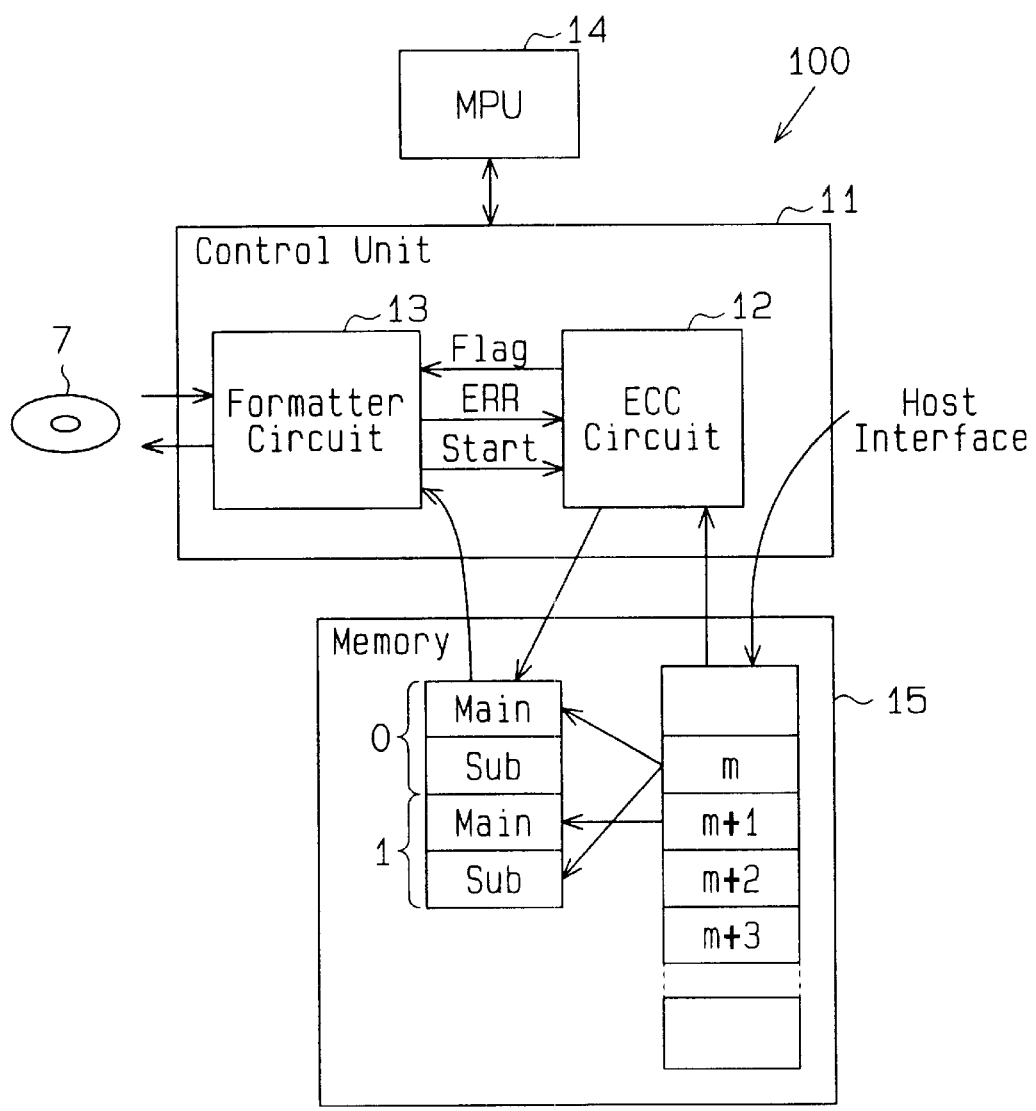
FIG. 3 is a schematic block diagram of a real-time recording system according to a first embodiment of the present invention.

FIG. 3 is a schematic block diagram showing a real-time recording system 100 according to a first embodiment of the present invention. The recording system 100 includes a control unit 11, an MPU 14, and a memory 15.

The control unit 11 includes an ECC circuit (error correction circuit) 12 and a formatter circuit 13. The MPU 14 controls the control unit 11 and peripheral devices (not shown).

The ECC circuit 12 and the formatter circuit 13 are connected to the memory 15. The memory 15 includes area m, m+1, . . . for storing image data transferred via a host interface. Further, the memory 15 includes a first section and a second section. The first section includes a main area (0-Main) and a sub area (0-Sub), and the second section includes a main area (1-Main) and a sub area (1-Sub).

The ECC circuit 12 generates a flag signal and provides the generated flag signal to the formatter circuit 13. The flag signal is inverted when the generation of a block of write data is completed.

The formatter circuit 13 generates a start pulse signal and an error signal (ERR) and provides the start pulse and error signals to the ECC circuit 12. The start pulse signal is generated when the write operation is started. The error signal takes the value of 1, or goes high, if one or more header errors are detected when reading the header ID of a block of data from a DVD-RAM 7.

The operation of the real-time recording system 100 will now be discussed with reference to FIGS. 4 to 9. As shown in the flowchart of FIG. 5, the ECC circuit 12 resets the flag signal to 0 when starting the ECC process. In other words, the flag signal goes low (step 1).

The ECC circuit 12 then reads the block of data stored in area m of the memory 15 and adds a predetermined data ID to the read data. The ECC circuit 12 performs the ECC process on the data to which the data ID is added and generates write data. Further, the ECC circuit 12 stores the ECC processed write data in area 0-Main of the memory 15 (step 2). When the storing of the write data to area 0-Main is completed, the ECC circuit 12 inverts the flag signal to the value of 1. In other words, the flag signal goes high (step 3).

Then, the ECC circuit 12 receives the high start pulse signal from the formatter circuit 13 (step 4) and changes the data ID to n=n+10 h (step 5). That is, the ECC circuit 12 increases the data ID by 10 h.

Figure 6:
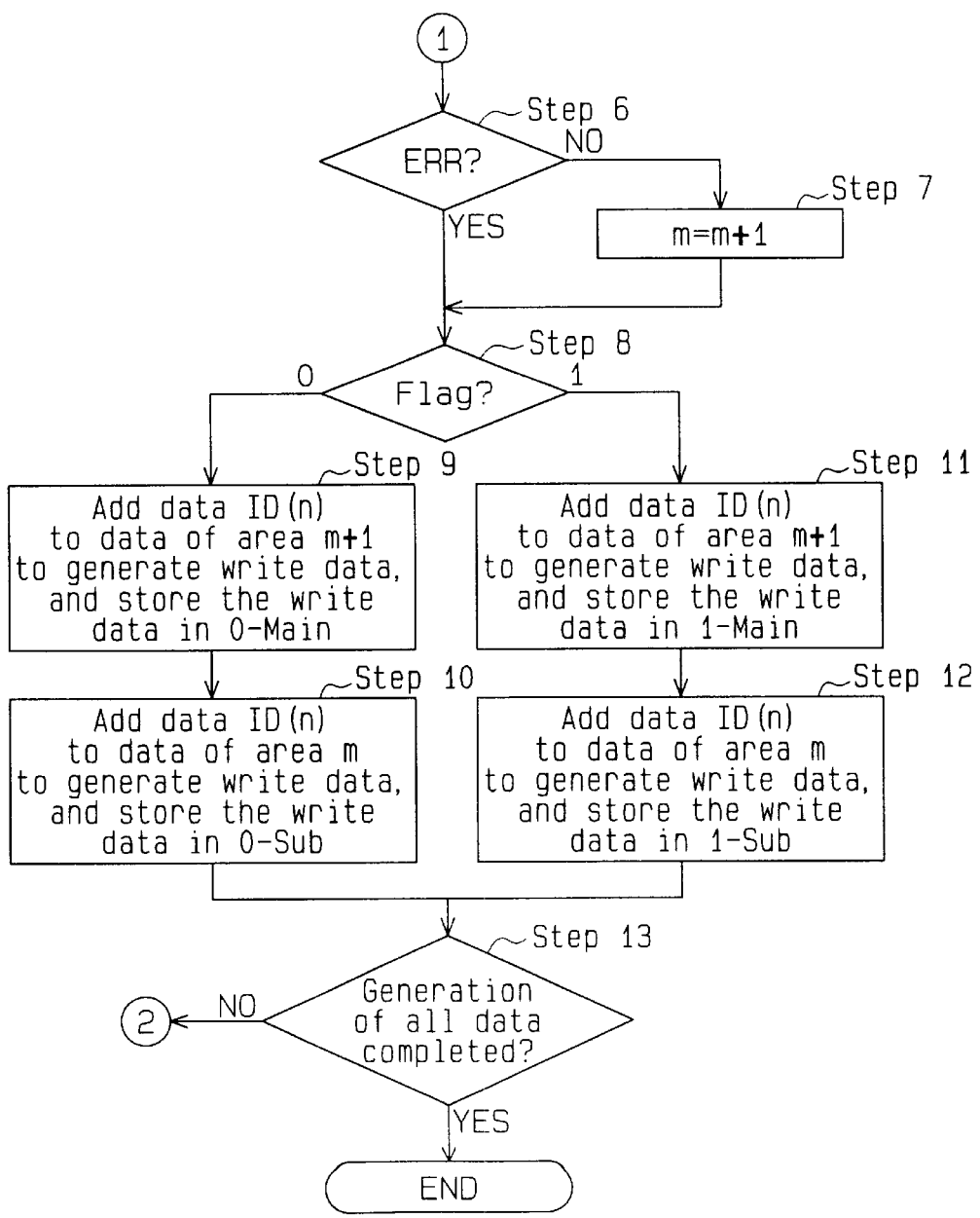
FIG. 6 is a flowchart illustrating the operation of the ECC circuit of the system of FIG. 3.

Subsequently, as shown in the flowchart of FIG. 6, the ECC circuit 12 determines whether a header error has occurred (step 6). More specifically, the ECC circuit 12 determines whether the value of the error signal provided from the formatter circuit 13 is 1 or 0. The error signal is set at 1 when the formatter circuit 13 detects the header error and set at 0 when the formatter circuit 13 does not detect the header error.

When the error signal is 0, the ECC circuit 12 shifts from area m to area m+1(step 7). When the error signal is 1, the ECC circuit 12 proceeds to step 8 without shifting from area m.

At step 8, the ECC circuit 12 determines whether the flag signal is 0 or 1. If the flag signal is 1, the ECC circuit 12 adds the predetermined ID to the data stored in area m+1of the memory 15 to generate write data. The generated write data (header error free write data) is stored in area 1-Main of the memory 15 (step 11).

Then, the ECC circuit 12 adds the predetermined ID to the data stored in area m of the memory 15 to generate write data. The generated write data (block-slip write data) is stored in area 1-Sub of the memory 15 (step 12).

If the flag signal is 0 in step 8, the ECC circuit 12 adds the predetermined ID to the data stored in area m+1 of the memory 15 and generates write data. The generated write data (header error free write data) is stored in area 0-Main of the memory 15 (step 9).

Then, the ECC circuit 12 adds the predetermined ID to the data stored in area m of the memory 15 to generate write data. The generated write data (block-slip write data) is stored in area 0-Sub of the memory 15 (step 10).

The ECC circuit 15 then determines whether the generation of the write data from all of the data stored in the memory areas (m, m+1, . . . ) has been completed (step 13). When determining that the write data generation has not been completed, the ECC circuit 12 repeats steps 3 to 13. When determining that the write data generation has been completed, the ECC circuit 12 completes the generation of write data.

The operation of the formatter circuit 13 will now be discussed with reference to the flowcharts of FIGS. 7 and 8. The formatter circuit 3 starts to operate when the ECC circuit 12 stores the first block of write data in area 0-Main of the memory 15. When operated, the formatter circuit 3 first initializes each of ERRF, error, and start pulse signals to the value of 0(step 21).

Then, the formatter circuit 13 reads a header ID from the DVD-RAM 7. When the read header ID matches the header ID at which data writing is started, the formatter circuit 13 writes the write data stored in area 0-Main to the DVD-RAM 7 (step 22).

Afterward, the formatter circuit 13 starts providing the start pulse signal to the ECC circuit 12 (step 23). The formatter circuit 13 reads the header ID sixteen times when writing a block of data. During this period, the formatter circuit 13 determines whether a header error has been detected (step 24).

If a header error is detected during the period in which the header ID is detected for sixteen times, the formatter circuit 13 sets the ERRF signal to 1 (step 25) and proceeds to step 26. If a header error is not detected, the formatter circuit 13 proceeds to step 25 and completes the writing of one block.

The formatter circuit 13 then sets the level of the error signal to the level of the ERRF signal and resets the ERRF signal to 0 (step 27).

Subsequently, the formatter circuit 13 writes the write data stored in one of the four areas 0-Main, 0-Sub, 1-Main, 1-Sub to the DVD-RAM 7 according to the flag signal and the error signal (step 28).

More specifically, when the flag signal and the error signal are both 0, the data stored in area 1-Main is written to the DVD-RAM 7. When the flag signal is 0 and the error signal is 1, the data stored in area 1-Sub is written to the DVD-RAM 7.

When the flag signal is 1 and the error signal is 0, the write data stored in area 0-Main is written to the DVD-RAM 7. When the flag signal and the error signal are both 1, the write data stored in area 0-Sub is written to the DVD-RAM 7.

The formatter circuit 13 performs steps 29 to 32, which are respectively identical to steps 23 to 26. Then, the formatter circuit 13 determines whether the writing of all data has been completed (step 33). If the write operation has not been completed, the formatter circuit 13 repeats steps 27 to 32.

Figure 9:
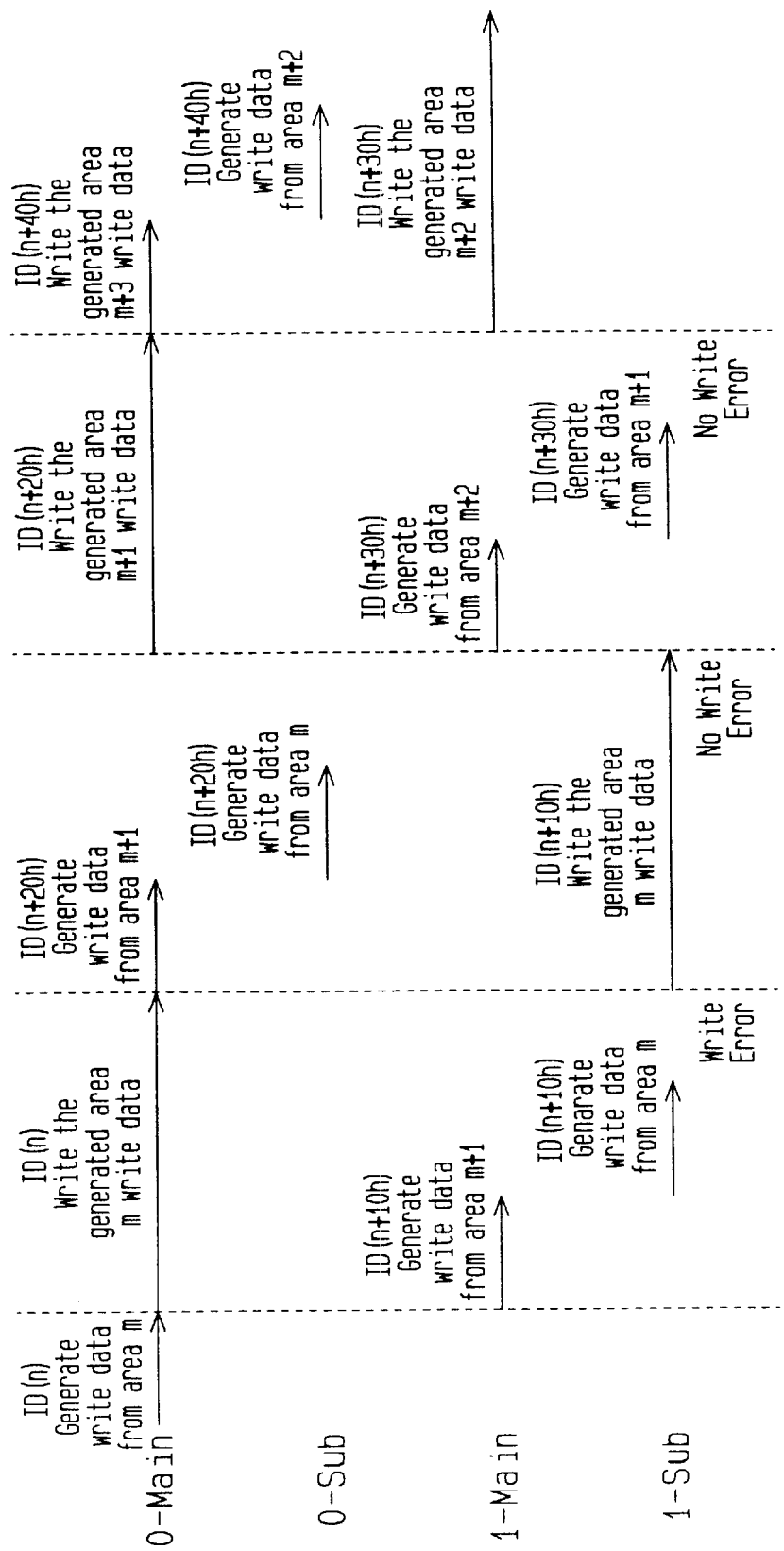
FIG. 9 is an explanatory diagram showing stored contents of a memory of the system of FIG. 3.

The operations of the ECC circuit 12 and the formatter circuit 13 will now be discussed with reference to the timing chart of FIG. 4 and the diagram of FIG. 9 showing the contents of areas 0-Main to 1-Sub in the memory 15.

In step 2 of FIG. 5, the ECC circuit 12 adds the data ID (n+0 h to n+Fh) to the data stored in area m of the memory 15 and generates write data. The generated write data is stored in area 0-Main of the memory 15. This changes the flag signal from 0 to 1, and the formatter circuit 13 provides the high start pulse signal to the ECC circuit 12.

The ECC circuit 12 then sets the data ID to n+10 h according to the start signal and generates the next write data. In this state, the error signal is 0 and the flag signal is 1. Thus, the ECC circuit 12 adds the data ID (n+10 h to n+1 Fh) to the data stored in area m+1 and generates write data. The generated write data is stored in area 1-Main of the memory 15.

Subsequently, the ECC circuit 12 adds the data ID (n+10 h to n+1 Fh) to the data stored in area m and generates block-slip write data. The generated block-slip write data is stored in area 1-Sub of the memory 15.

Figure 4:
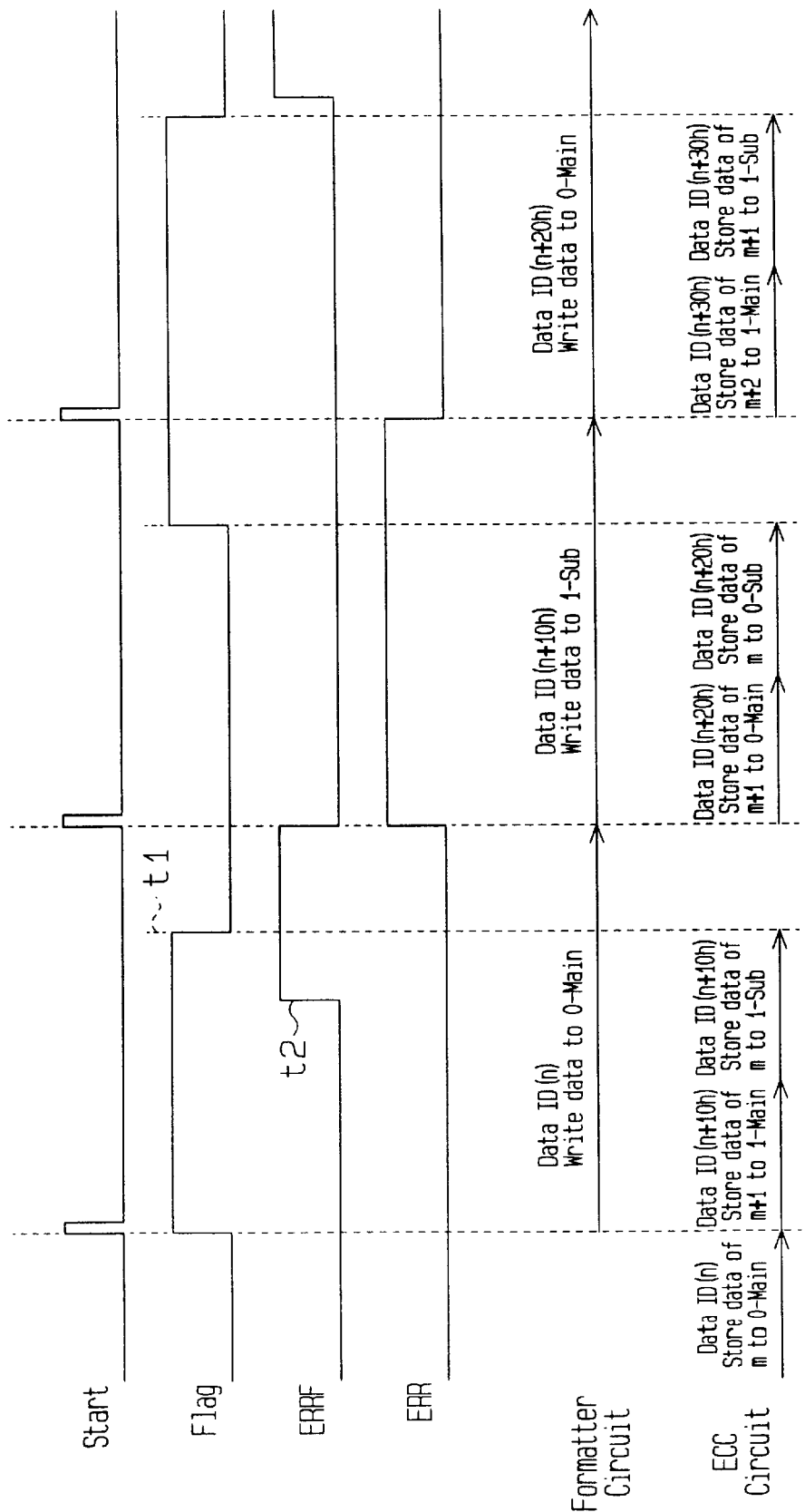
FIG. 4 is a combined timing and waveform chart showing the operation of the system of FIG. 3.
Figure 5:
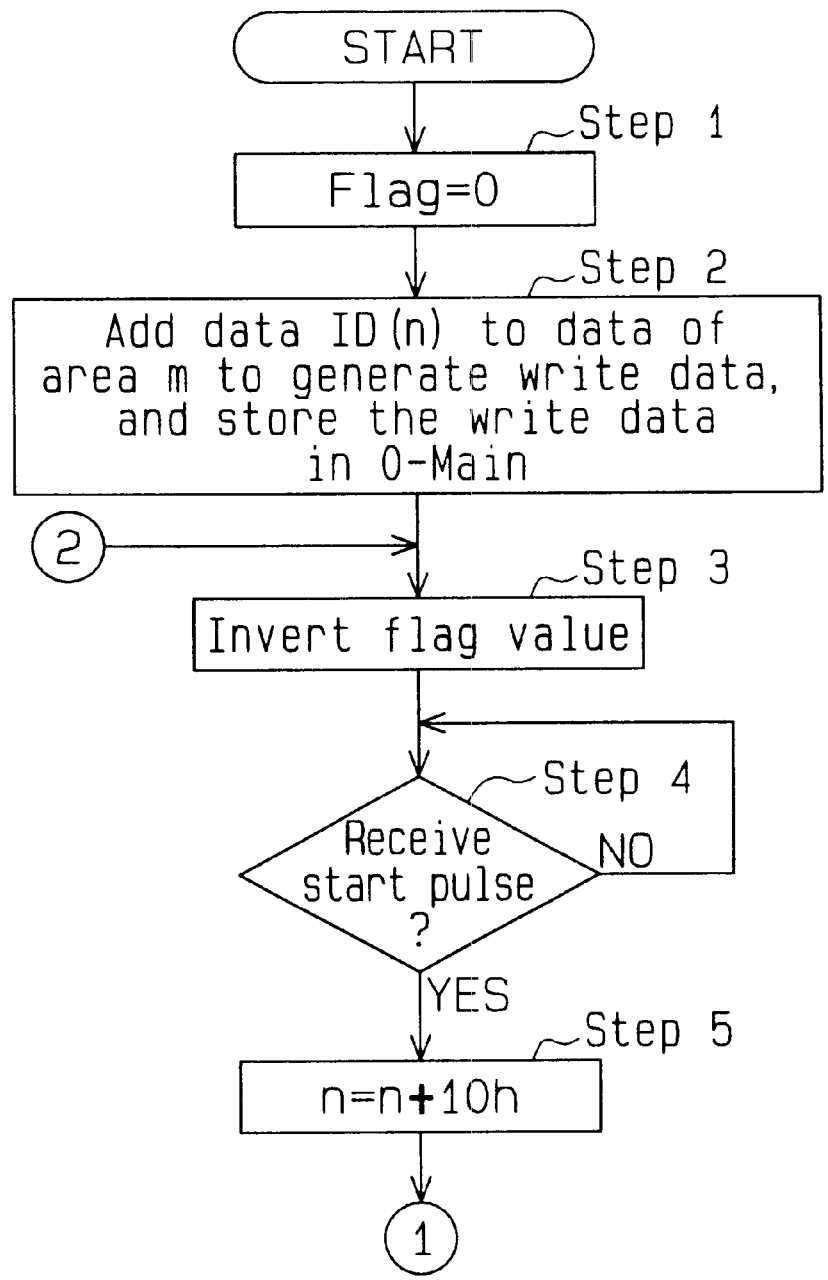
FIG. 5 is a flowchart illustrating the operation of an ECC circuit of the system of FIG. 3.

In FIG. 4, the storing of write data to area 1-Main and area 1-Sub is completed at time t1. This inverts the flag signal to 0. When the flag signal is 1, the formatter circuit 13 writes the block of data stored in area 0-Main to the DVD-RAM 7 while reading the header ID from the DVD-RAM 7 sixteen times.

If a header error is detected when reading the header ID, the formatter circuit 13 sets the ERRF signal to 1 at, for example, time t2 in FIG. 4. When the writing of the data stored in the area 0-Main is completed, the value of the error signal is set to the value of the ERRF signal, which is 1. Subsequently, the ERRF signal is cleared to 0.

The formatter circuit 13 then starts the second writing operation and provides the start pulse signal to the ECC circuit 12. In this state, the flag signal is 0 and the error signal is 1. Thus, in the second write operation, the data stored in area 1-Sub is written to the DVD-RAM 7. In other words, the data of area m is rewritten to the DVD-RAM 7.

The ECC circuit 12 sets the data ID to n+20 h according to the start pulse signal. Since the error signal is 1 and the flag signal is 0, the ECC circuit 12 adds the data ID (n+20 h to n+2 Fh) to the data stored in area m+1 to generate write data. The generated write data is stored in area 0-Main of the memory 15.

Further, the ECC circuit 12 adds the data ID (n+20 h to n+2 Fh) to the data stored in area m and generates block-slip write data. The generated block-slip write data is stored in area 0-Sub of the memory 15. When the write data is stored in the memory 15, the flag signal is inverted to 1.

During the second write operation, the error signal is held at 0 when the header error is not detected.

In the third write operation, the flag signal is set at 1 and the error signal is set at 0. Thus, the formatter circuit 13 starts writing the data stored in area 0-Main. The formatter circuit 13 provides the start pulse signal to the ECC circuit 12. According to the start pulse signal, the ECC circuit 12 sets the data ID to (n+30 h). In this state, the error signal is set at 0 and the flag signal is set at 1. Thus, the ECC circuit 12 adds the data ID (n+30 h to n+3 Fh) to the data stored in area m+2 and generates the write data. The generated write data is stored in area 1-Main of the memory 15.

Further, the ECC circuit 12 adds the data ID (n+30 h to n+3 Fh) to the data stored in area m+1 and generates block-slip data. The generated block-slip write data is stored in area 1-Sub of the memory 15.

The ECC circuit 12 and the formatter circuit 13 repeat the above operation to generate write data and write the data to the DVD-RAM 7.

The real-time recording system 100 of the first embodiment has the advantages discussed below.

(1) The ECC circuit 12 generates write data using the data stored in one of areas m, m+1, . . . according to the start signal and the error signal regardless of whether or not the header error is detected. Thus, the MPU 14 does not have to recognize the header error and does not have to instruct the ECC circuit 12 of the write data that is to be generated. This decreases the load applied to the MPU 14.

(2) The ECC circuit 12 determines which one of areas 0-Main to 1-Sub the generated write data is to be stored according to the flag signal. The formatter circuit 13 determines from which one of the areas 0-Main to 1-Sub the write data is to be read and writes the write data to the DVD-RAM 7 according to the flag signal and the error signal. Thus, the MPU 14 does not have to recognize in which one of the areas of the memory 15 the write data is stored. This decreases the load of the MPU 14.

(3) The ECC circuit 12 and the formatter circuit 13 generate the write data and perform the write operation according to the flag signal and the error signal without using the MPU 14. This increases the data generating and data writing speed.

(4) Since the load on the MPU 14 is decreased, the processing speed of other peripheral devices controlled by the MPU 14 is increased.

Figure 10:
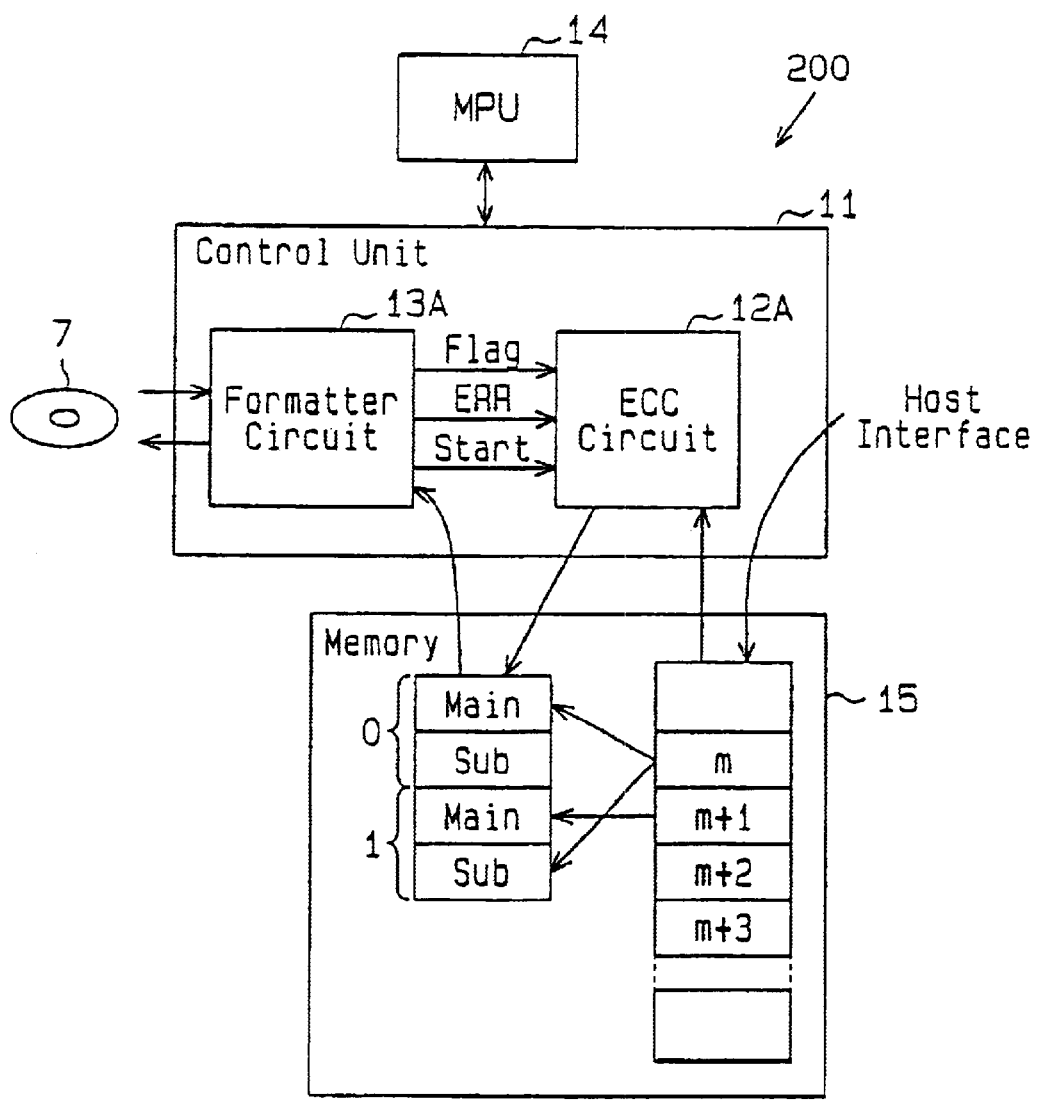
FIG. 10 is a schematic block diagram of a real-time recording system according to a second embodiment of the present invention.

FIG. 10 is a schematic block diagram of a real-time recording system 200 according to a second embodiment of the present invention. In the second embodiment, a formatter circuit 13A generates the flag signal and provides the flag signal to an ECC circuit 12A. The remaining parts of the recording system 200 are the same as the recording system 100 of the first embodiment.

The operation of the recording system 200 will now be discussed with reference to FIGS. 11 to 14. The operation of the ECC circuit 12A illustrated in the flowchart of FIG. 11 (steps 41 to 51) is the same as the operation of the ECC circuit 12 in the first embodiment illustrated in FIG. 5 except in that steps 1 and 3 are eliminated.

Figure 7:
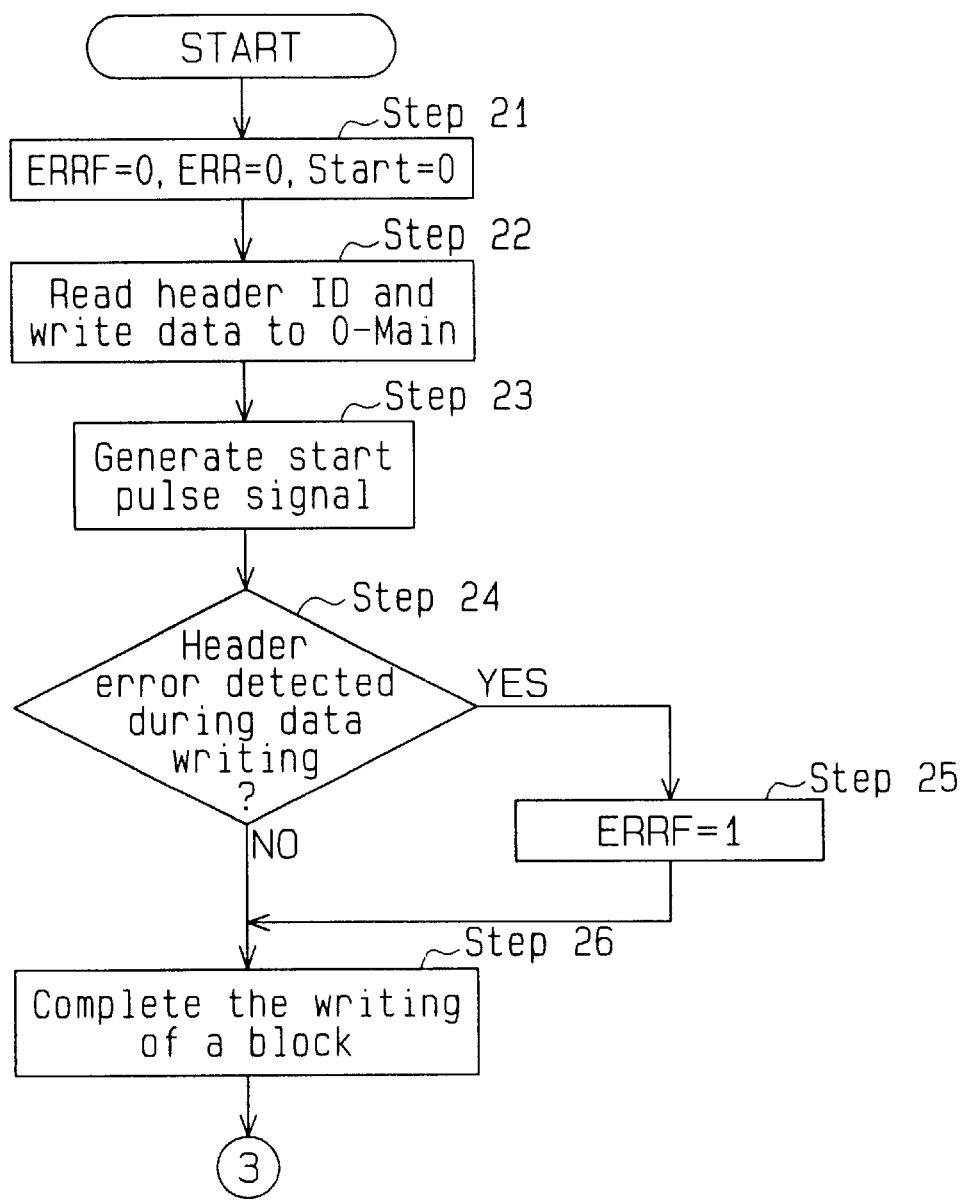
FIG. 7 is a flowchart illustrating the operation of a formatter circuit of the system of FIG. 3.
Figure 8:
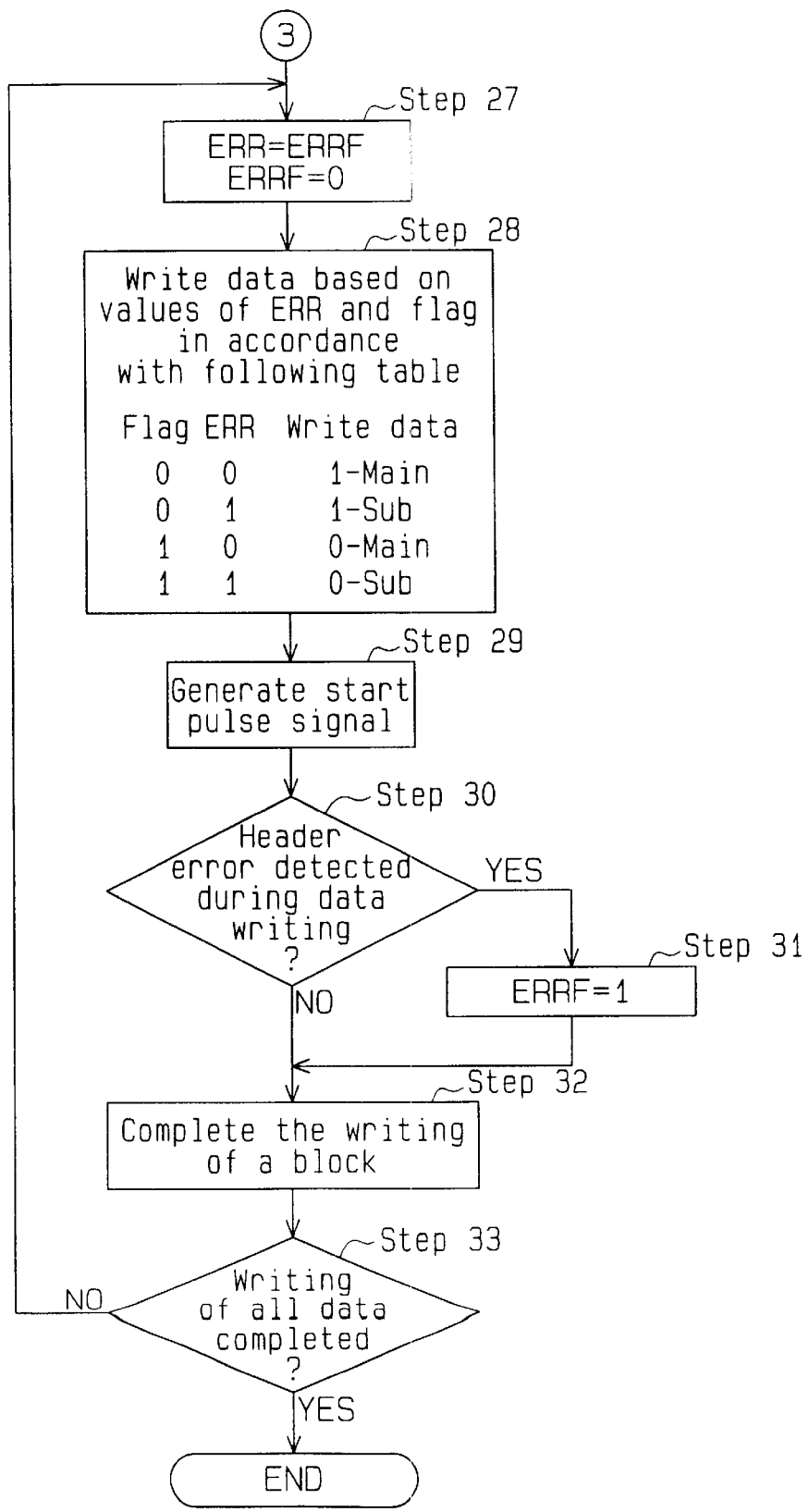
FIG. 8 is a flowchart illustrating the operation of the formatter circuit of the system of FIG. 3.
Figure 12:
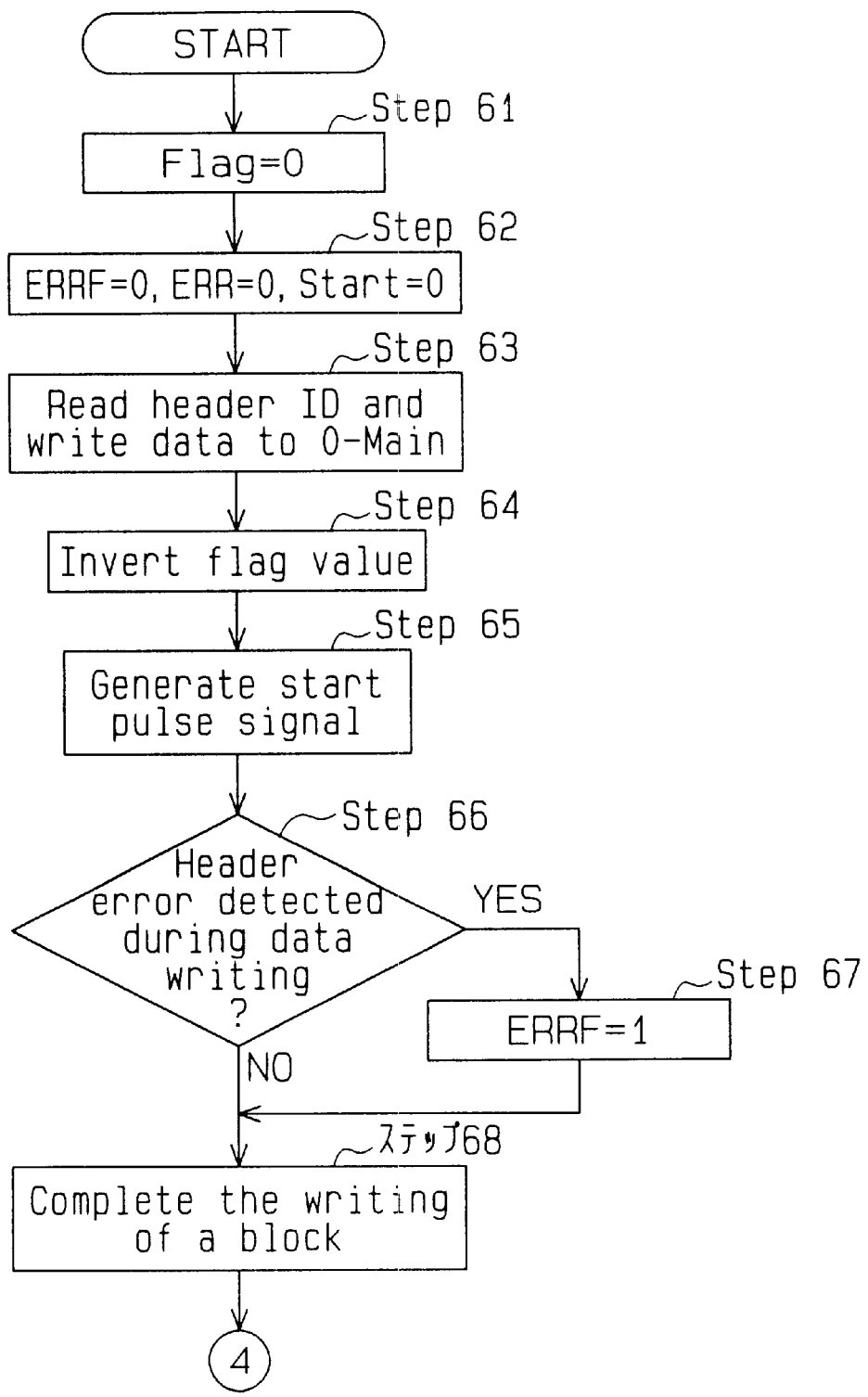
FIG. 12 is a flowchart illustrating the operation of a formatter circuit of the system of FIG. 10.
Figure 13:
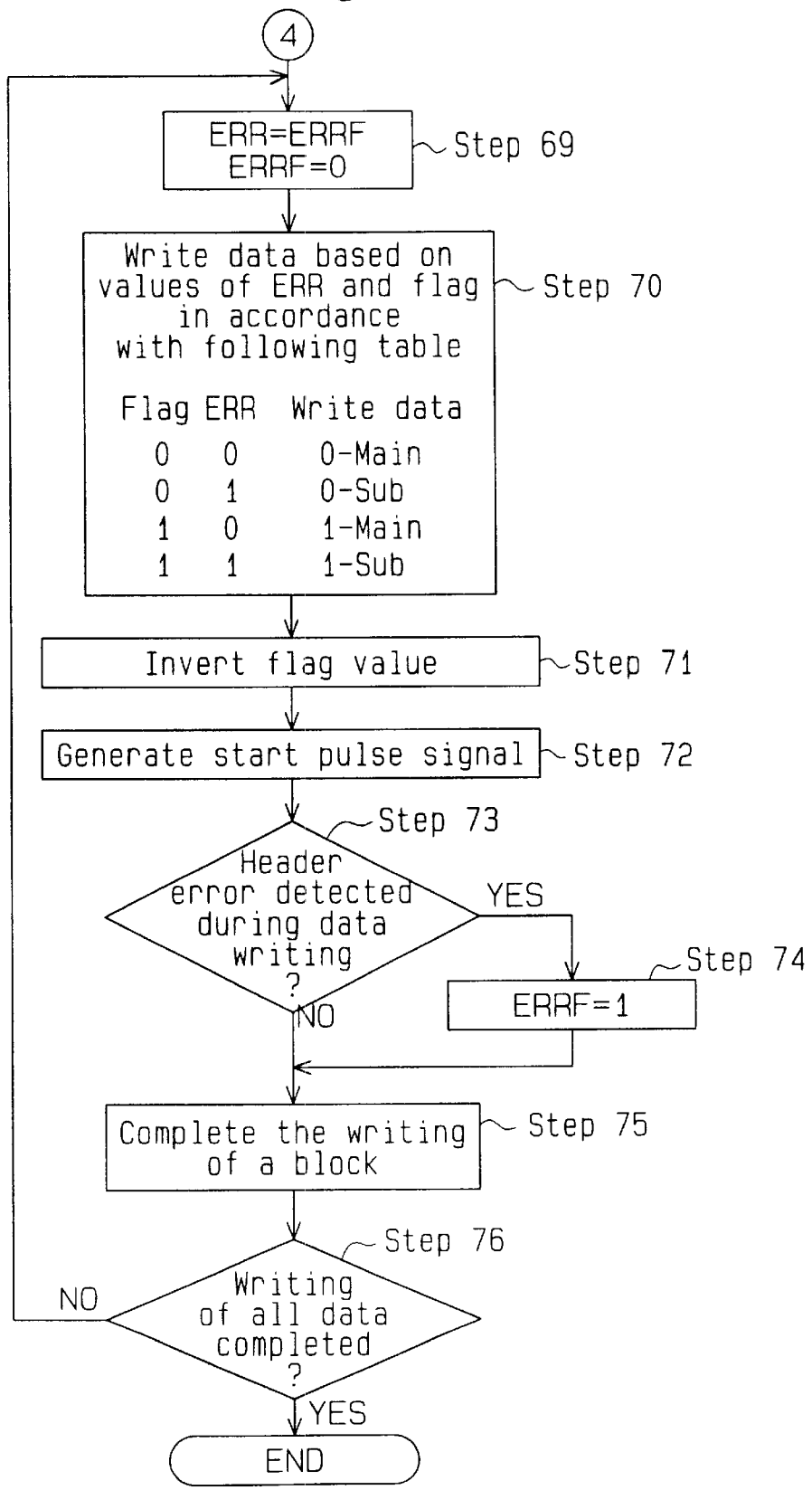
FIG. 13 is a flowchart illustrating the operation of the formatter circuit of the system of FIG. 10.

The operation of the formatter circuit 13A illustrated in the flowcharts of FIGS. 12 and 13 (steps 61 to 76) is the same as the operation of the formatter circuit 13 illustrated in the flowcharts of FIGS. 7 and 8 except in that steps 61 and 64 are added.

Figure 14:
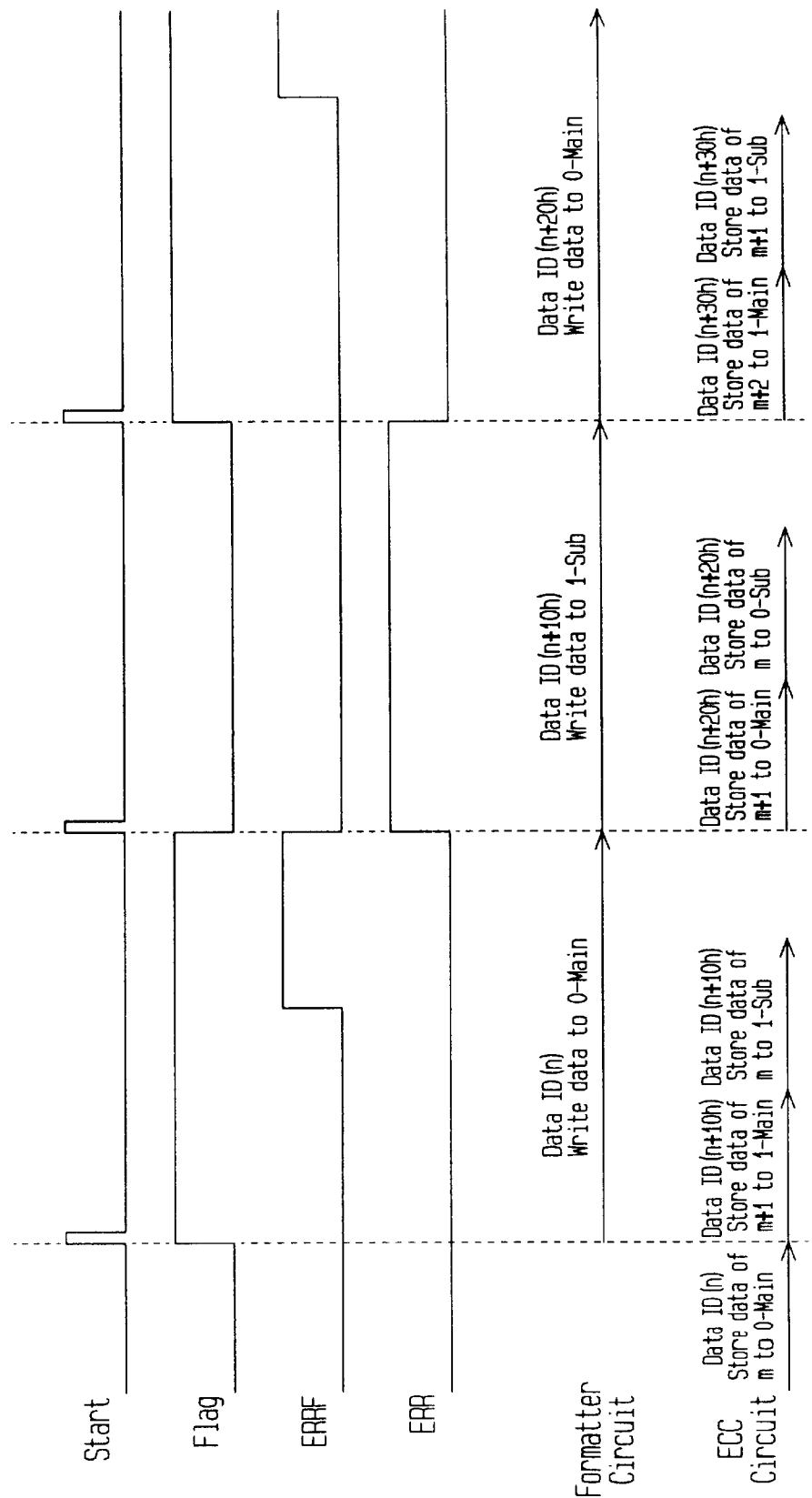
FIG. 14 is a combined timing and waveform chart showing the operation of the system of FIG. 10.

The operations of the ECC circuit 12A and the formatter circuit 13A will now be discussed with reference to the timing chart of FIG. 14.

Figure 11:
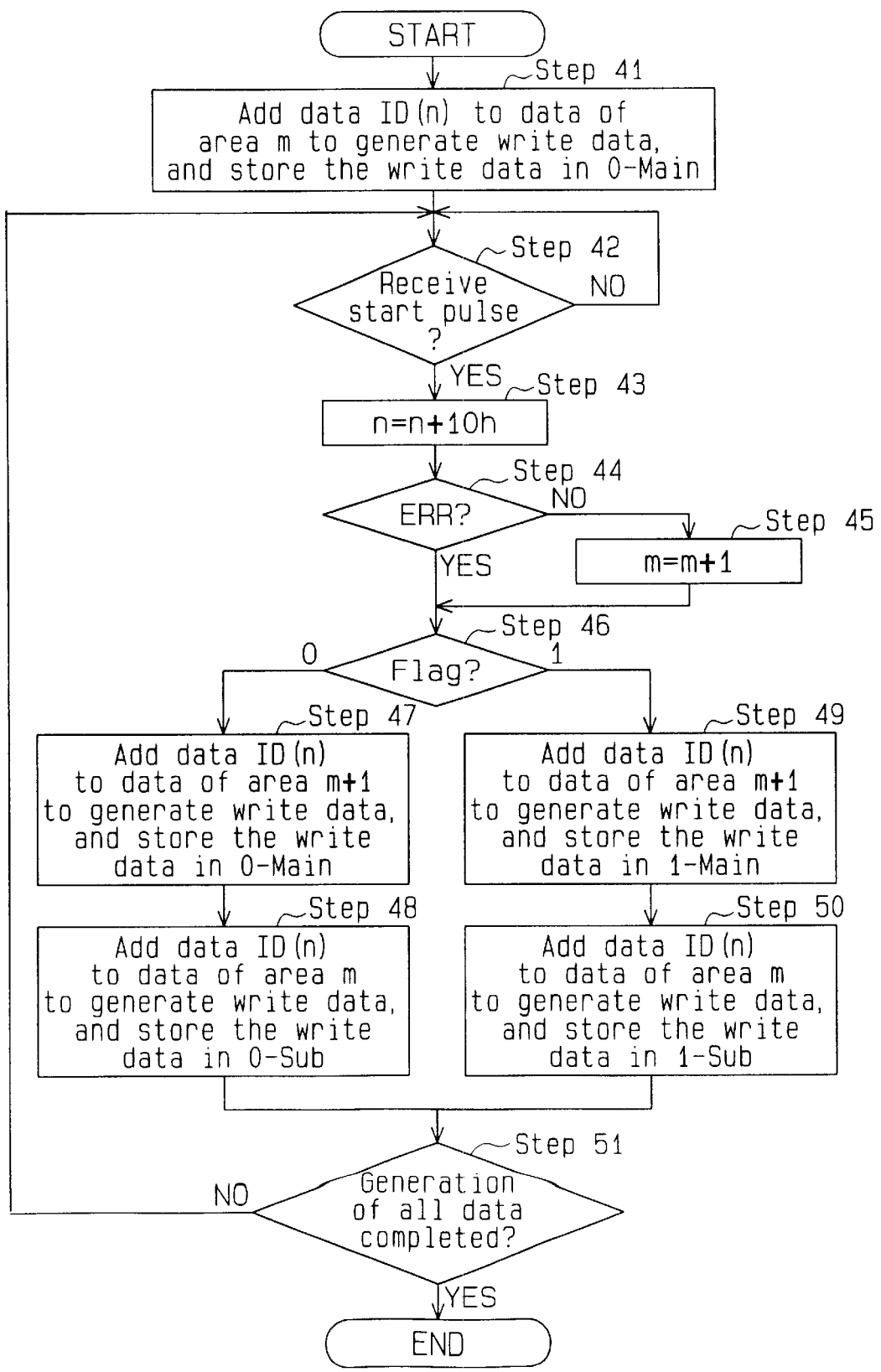
FIG. 11 is a flowchart illustrating the operation of an ECC circuit of the system of FIG. 10.

In step 41 of the flowchart illustrated in FIG. 11, the ECC circuit 12A adds the data ID (n+0 h to n+Fh) to the data stored in area m of the memory 15. The generated write data is stored in area 0-Main of the memory 15.

When the ECC circuit 12A completes storing the write data to area 0-Main, the formatter circuit 13A starts writing the write data stored in area 0-Main to the DVD-RAM 7 (step 63). In this state, the formatter circuit 13A inverts the flag signal from 0 to 1 and generates the start pulse signal (steps 64, 65). The start pulse signal is provided to the ECC circuit 12A.

The ECC circuit 12A then adds 10 h to the data ID according to the start pulse signal and generates the next write data. In this state, the error signal is 0 and the flag signal is 1. Thus, the ECC circuit 12A adds the data ID (n+10 h to n+1 Fh) to the data stored in area m+1 and generates write data. The generated write data is stored in area 1-Main of the memory 15 (step 49).

Afterward, the ECC circuit 12 adds the data ID (N+10 h to n+1 Fh) to the data stored in area m and generates block-slip data. The generated block-slip write data is stored in area 1-Sub of the memory 15 (step 50). When the flag signal is set at 1, the formatter circuit 13A reads the header ID sixteen times while writing a block of data.

If one of more header errors are detected when reading the header ID of a block of data, the formatter circuit 13A sets the ERRF signal to 1 and then completes the writing of one block of data (step 68). In this state, the value of the error signal becomes equal to that of the ERRF signal, which is 1. Afterward, the ERRF signal is cleared to 0 (step 69).

Then, the second data writing operation is performed. In this state, the flag signal is set at 1 and the error signal is set at 1. Thus, the formatter circuit 13A starts the writing of the data stored in area 1-Sub (step 70).

The formatter circuit 13A inverts the flag signal to 0 when the writing of data starts and provides the start pulse signal to the ECC circuit 12A (steps 71, 72). When the ECC circuit 12A receives the start pulse signal, the ECC circuit adds 10h to the data ID. Since the error signal is 1 and the flag signal is 0, the ECC circuit 12A adds the data ID (n+20 h to n+2 Fh) to the data stored in area m+1 and generates write data. The generated write data is stored in area 0-Main (step 47).

The ECC circuit 12A adds the data ID (n+20 h to n+2 Fh) to the data stored in area m and generates block-slip write data. The generated block-slip write data is stored in area 0-Sub of the memory 15 (step 48).

When a header error is not detected during the second writing operation, the error signal is held at 0.

When the third write operation is performed, the flag signal is 0 and the error signal is 0. Thus, the formatter circuit 13A starts writing the data stored in area 0-Main (step 70). The formatter circuit 13A inverts the flag signal to 1 when the writing of data is started and provides the start pulse signal to the ECC circuit 12A (steps 71, 72). The ECC circuit 12A further adds 10 h to the data ID when receiving the start pulse signal. Since the error signal is 0 and the flag signal is 1, the ECC circuit 12A adds the data ID (n+30 h to n+3 Fh) to the data stored in area m+2. The generated write data is stored in area 1-Main (step 49).

Then, the ECC circuit 12A adds the data ID (n+30 h to n+3 Fh) to the data stored in area m+1 and generates block-slip write data. The generated block-slip write data is stored in area 1-Sub of the memory 15 (step 50).

The real-time recording system 200 of the second embodiment has the same advantages as the recording system 100 of the first embodiment.

Figure 15:
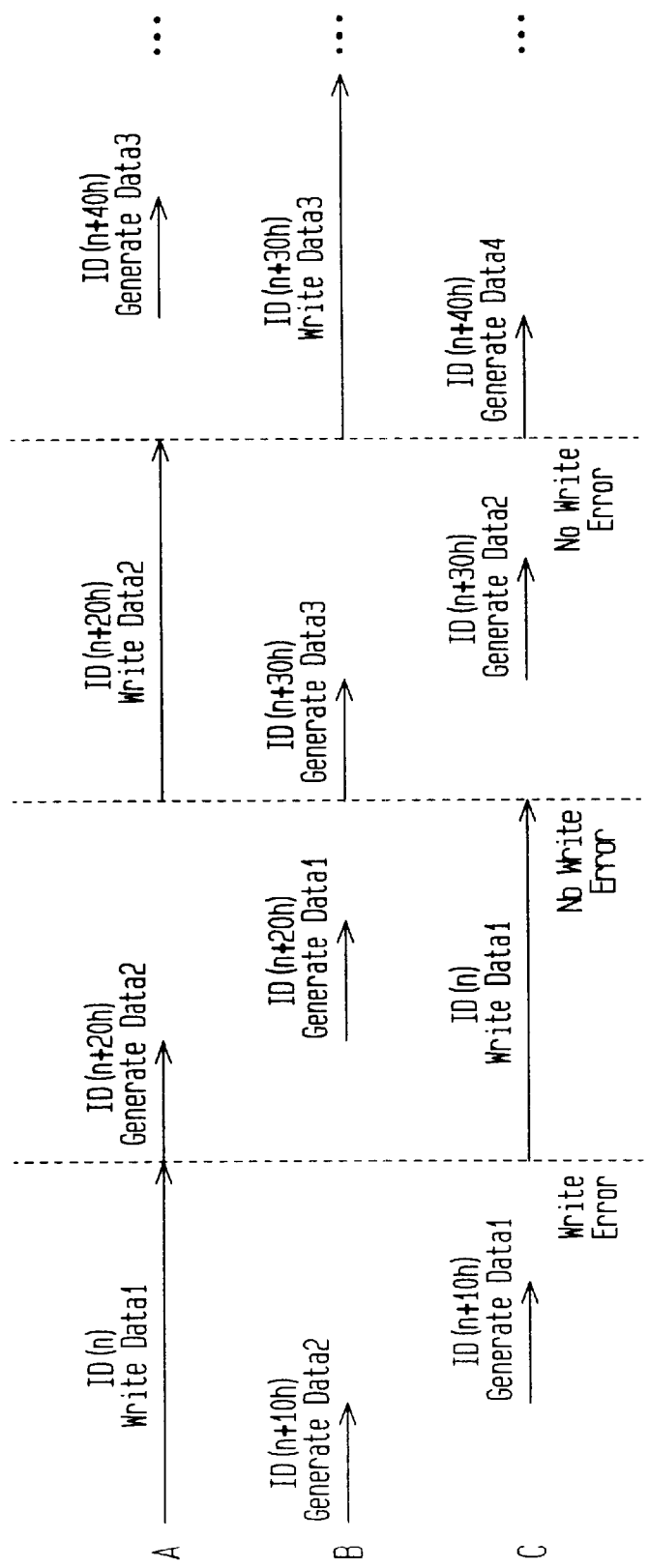
FIG. 15 is an explanatory diagram showing stored contents of a memory in a real-time recording system according to a third embodiment of the present invention.

The write data generated by the ECC circuits 12 or 12A may be stored in one of three areas A, B, C as shown in FIG. 15.

In the third embodiment, the ECC circuits 12, 12A sets a pointer value that recognizes, for example, the data of the three areas A to C. The ECC circuits 12, 12A then sequentially writes the write data of the sections A to C to the memory 15. The formatter circuits 13, 13A read the write data from the memory 15 based on the pointer value and performs the write operation.

The recording system of the third embodiment decreases the area of the memory 15 that is required for storing write data.

It should be apparent to those skilled in the art that the present invention may be embodied in many other specific forms without departing from the spirit or scope of the invention. Particularly, it should be understood that the present invention may be embodied in the following forms.

The number of memory areas for storing write data may be five or more.

The recording medium may be a CD-RAM, a writable CD-ROM, or a writable DVD-ROM.

The ERRF signal may be set to 1 when the head error is detected two times or more during the writing of a block of data.

The present examples and embodiments are to be considered as illustrative and not restrictive, and the invention is not to be limited to the details given herein, but may be modified within the scope and equivalence of the appended claims.

What is claimed is:

1. A recording system for receiving input data and simultaneously recording the input data to a recording medium, the system comprising:
a memory for storing the input data;
an error correction circuit connected to the memory for generating write data from the input data and storing the generated write data in the memory; and
a formatter circuit connected to the memory to produce read write data and the error correction circuit for reading the write data stored in the memory and writing the read write data to the recording medium in real-time, wherein the error correction and formatter circuits are controlled for the generation of the write data with the error correction circuit and the writing operation with the formatter circuit by a plurality of control signals being transferred between the error correction circuit and the formatter circuit.

2. The system according to claim 1, wherein the plurality of control signals include a flag signal, an error signal, and a start signal, wherein the error correction circuit generates the flag signal every time the generation of a block of the write data is completed, the formatter circuit generates the error signal when a header error is detected and the start signal when the writing operation is started, and wherein the error correction circuit generates the write data and stores the generated write data in the memory according to the flag, error, and start signals, and the formatter circuit reads the write data from a predetermined area of the memory and writes the read write data to the recording medium according to the flag and error signals.

3. The system according to claim 2, wherein the memory includes a plurality of areas for storing the write data, and the error correction circuit stores header error free write data and block-slip write data for rewriting to one of the plurality of areas.

4. The system according to claim 2, wherein the memory includes a first section and a second section, the first section including a main area and a sub area, and the second section including a main area and a sub area, wherein the error correction circuit selects one of the first and second sections according to the flag signal, stores header error free write data in the main area of one of the first and second sections, and stores block-slip write data for rewriting in the sub area of one of the first and second sections.

5. The system according to claim 4, wherein the formatter circuit reads the header error free write data stored in the main area of one of the first and second sections when a header error is not detected and writes the header error free write data to the recording medium, and the formatter circuit reads the block-slip write data stored in the sub area of one of the first and second sections when a header error is detected and writes the block-slip write data to the recording medium.

6. The system according to claim 2, wherein the memory includes three areas for storing the write data, and the error correction circuit stores header error free write data and block-slip write data for rewriting to one of the three areas according to the flag signal.

7. The system according to claim 1, wherein the plurality of control signals include a flag signal, an error signal, and a start signal, wherein the formatter circuit generates the flag signal and the start signal when the writing operation is started and generates the error signal a header error is detected, the error correction circuit generates the write data and stores the generated write data in the memory according to the flag, error, and start signals, and the formatter circuit reads the write data from a predetermined area of the memory and writes the read write data to the recording medium according to the flag and error signals.

8. The system according to claim 7, wherein the memory includes a plurality of areas for storing the write data, and the error correction circuit stores header error free write data and block-slip write data for rewriting to one of the plurality of areas.

9. The system according to claim 7, wherein the memory includes a first section and a second section, the first section including a main area and a sub area, and the second section including a main area and a sub area, wherein the error correction circuit selects one of the first and second sections according to the flag signal, stores header error free write data in the main area of one of the first and second sections, and stores block-slip write data for rewriting in the sub area of one of the first and second sections.

10. The system according to claim 9, wherein the formatter circuit reads the header error free write data stored in the main area of one of the first and second sections when a header error is not detected and writes the header error free write data to the recording medium, and the formatter circuit reads the block-slip write data stored in the sub area of one of the first and second sections when a header error is detected and writes the block-slip write data to the recording medium.

11. The system according to claim 7, wherein the memory includes three areas for storing the write data, and the error correction circuit stores header error free write data and block-slip write data for rewriting to one of the three areas according to the flag signal.

12. The system according to claim 1, wherein the error correction circuit adds a data ID to the write data.

13. A method for recording data in a recording system including a memory for storing input data, an error correction circuit connected to the memory for generating write data from the input data and storing the generated write data in the memory, and a formatter circuit connected to the memory and the error correction circuit for reading the write data stored in the memory to produce read write data and writing the read write data to a recording medium in real-time, the method comprising the steps of:

generating the read write data with the error correction circuit by transferring a plurality of control signals between the error correction circuit and the formatter circuit; and writing the write data to the recording medium with the formatter circuit according to the plurality of control signals.

14. The method according to claim 13, wherein the plurality of control signals include a flag signal, an error signal, and a start signal, the method further comprising the steps of:

generating the flag signal with the error correction circuit every time the generation of a block of the write data is completed;

generating the start signal with the formatter circuit when the writing operation is started; and generating the error signal with the formatter circuit a header error is detected, wherein the step for generating the write data includes generating the write data and storing the generated write data in the memory with the error correction circuit according to the flag, error, and start signals, and the step for writing the write data to the recording medium includes reading the write data from a predetermined area of the memory and writing the read write data to the recording medium with the formatter circuit according to the flag and error signals.

15. The method according to claim 13, wherein the plurality of control signals include a flag signal, an error signal, and a start signal, the method further comprising the steps of:

generating the flag signal and the start signal with the formatter circuit when the writing operation is started; and generating the error signal with the formatter circuit when a header error is detected, wherein the step for generating the write data includes generating the write data and storing the generated write data in the memory with the error correction circuit according to the flag, error, and start signals, and the step for writing the write data to the recording medium includes reading the write data from a predetermined area of the memory and writing the read write data to the recording medium with the formatter circuit according to the flag and error signals.

* * * * *